(12) United States Patent
Hulsey

(10) Patent No.: US 7,382,535 B2
(45) Date of Patent: Jun. 3, 2008

(54) WAVE PLATE AND ASSOCIATED METHOD

(75) Inventor: Daniel E. Hulsey, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/243,393

(22) Filed: Oct. 4, 2005

(65) Prior Publication Data

US 2007/0076291 A1    Apr. 5, 2007

(51) Int. Cl.
*G02B 5/30*    (2006.01)

(52) U.S. Cl. ...................... 359/497; 359/500

(58) Field of Classification Search .............. 359/321, 359/322, 497–500
See application file for complete search history.

(56) References Cited

U.S. PATENT DOCUMENTS

| | | | |
|---|---|---|---|
| 2,441,049 A | 5/1948 | West | |
| 2,607,272 A | 8/1952 | Bond | |
| 4,497,542 A | 2/1985 | Kaye | |
| 5,892,612 A | 4/1999 | Miller et al. | |
| 6,680,798 B2 | 1/2004 | Kreuzer | |
| 6,844,972 B2 | 1/2005 | McGuire, Jr. | |
| 2004/0263814 A1 | 12/2004 | Unno | |
| 2005/0062917 A1 | 3/2005 | Kashima | |
| 2005/0286038 A1* | 12/2005 | Albert et al. | .............. 355/71 |

OTHER PUBLICATIONS

Joel A. Kramer, *Achromatic Wavepates Solve Problem of Variable Retardation with Tunable Laser Sources*, Tower Optical Corporation News Release, 2 pages, Jul. 24, 2003.
PCT Notification of Transmittal of the International Search Report and the Written Opinion of The International Searching Authority, or the Declaration, mailed Jan. 19, 2007 for PCT/US2006/008666 (Filed Oct. 4, 2006).
Hale P D et al.: Stability of birefringent linear retarders; Applied Optics, OSA; Optical Society of America, Washington DC, USA, vol. 27, No. 24; Dec. 15, 1988, pp. 5146-5153.

* cited by examiner

*Primary Examiner*—Ricky Mack
*Assistant Examiner*—William C Choi
(74) *Attorney, Agent, or Firm*—Alston & Bird LLP

(57) ABSTRACT

An improved wave plate and associated method are provided. The wave plate includes a plurality of layers of uniaxial crystal including at least one layer of positive uniaxial crystal and at least one layer of negative uniaxial crystal. The thicknesses of the layers are configured to achieve both a desired retardance and an insensitivity to angle of incidence.

19 Claims, 3 Drawing Sheets

WAVE PLATE AND ASSOCIATED METHOD

FEDERALLY SPONSORED RESEARCH OR DEVELOPMENT

This invention was made with Government support under Contract No. FA9453-04-C-0050 awarded by the U.S. Air Force. The Government has certain rights in this invention.

BACKGROUND OF THE INVENTION

1. Field of the Invention

The present invention is related to wave plates and, more particularly, to wave plates including uniaxial crystals for achieving an insensitivity to angle of incidence.

2. Description of Related Art

Wave plates are devices that alter the polarization of optical signals when optical signals pass through the wave plate. Birefringent materials, which are refractive materials typically used for wave plates, exhibit an anisotropic index of refraction or velocity of propagation of optical signals passing therethrough. The index of refraction varies for different polarizations, and the relative amount of phase shift of the polarized optical signals through the birefringent material is generally referred to as retardance. At any specific wavelength, the phase difference is governed by the thickness of the wave plate.

Birefringent materials separate incoming signals into orthogonally polarized beams that propagate with their polarization directions along different axes, namely extraordinary and ordinary axes. Uniaxial birefringent materials include a single axis (i.e., extraordinary axis) that defines a direction along which signals propagate differently than along the remaining two axes (i.e., ordinary axes). Some uniaxial birefringent materials, such as quartz, include a symmetry axis (i.e., optic axis) having two principal indices of refraction: a slow axis and a fast axis. The axis along which the material has the smallest refractive index is the fast axis, such that optical signals polarized parallel to the fast axis travel faster than optical signals parallel to the slow axis. With respect to positive uniaxial crystals, such as quartz, the extraordinary axis is the slow axis, while the ordinary axis is the fast axis. In contrast, the extraordinary axis of negative uniaxial crystals, such as sapphire, is the fast axis, while the ordinary axis is the slow axis.

The design of optical systems that employ polarization wave plates can be unduly limited by changes in wave plate performance with angle of incidence of the incoming signals. In general, systems employing a wave plate require the retardance to be constant independent of angle, otherwise system performance is degraded as the angle of the optical signal changes. However, the amount of retardation of a conventional wave plate changes as the angle of the optical signals passing through it changes. This effect can sometimes be made small by using a true zero-order wave plate, but these wave plates are extremely thin and delicate if made of conventional birefringent crystals. Multi-order or compound pseudo zero-order wave plates are made of crystals with more reasonable (practical) thicknesses, but the range of angles they can be used over is undesirably limited by the angular dependence of their retardance.

It would therefore be advantageous to provide an improved wave plate capable of compensating for angular sensitivity. In addition, it would be advantageous to provide a wave plate capable of achieving a desired retardance. Furthermore, it would be advantageous to provide a wave plate that is durable and practical for various applications over a greater range of angles.

BRIEF SUMMARY OF THE INVENTION

Embodiments of the invention address the above needs and achieve other advantages by providing a wave plate that is capable of achieving a desired retardance, while reducing the angular sensitivity of the wave plate. The wave plate includes at least one layer of positive uniaxial crystal and at least one layer of negative uniaxial crystal. The fast axes of each of the positive and negative layers of uniaxial crystal may be aligned such that the retardance of the layers add together or subtract from one another. In addition, the thicknesses of each of the layers of uniaxial crystal may be selected to reduce or eliminate the angular sensitivity of the wave plate. As a result, the wave plate may have more practical thicknesses without suffering a significant change in retardance resulting from changes in the angle of incident optical signals.

In one embodiment of the present invention, a wave plate is provided. The wave plate could be a multi-order wave plate. The wave plate includes a plurality of layers of uniaxial crystal that are positioned such that a respective fast axis of at least a pair of layers is substantially commonly aligned or substantially perpendicular, thereby causing a retardance of the pair of uniaxial crystals to be cumulative or at least partially cancel one another.

In various aspects of the wave plate, at least one layer of uniaxial crystal includes a layer of positive uniaxial crystal, such as quartz. Similarly, at least one layer of uniaxial crystal may include a layer of negative uniaxial crystal, such as sapphire. A thickness of each of the layers of uniaxial crystal may be configured to reduce an angle sensitivity of the wave plate. Moreover, at least a pair of layers of uniaxial crystal may have substantially the same retardance and have their fast axes aligned substantially perpendicular to one another such that the on-axis retardance of the pair is nominally zero. An additional layer of uniaxial crystal may be provided, and the angle sensitivity of the additional layer and the pair of layers may substantially cancel one another.

In another embodiment of the present invention, a wave plate is provided that includes at least one layer of positive uniaxial crystal, such as quartz, and at least one layer of negative uniaxial crystal, such as sapphire. The layer of negative uniaxial crystal has a thickness and position such that an angle sensitivity of the layer of positive uniaxial crystal is substantially equal and opposite to an angle sensitivity of the layer of negative uniaxial crystal. A fast axis of each of the layers of positive and negative uniaxial crystal may be substantially aligned or substantially perpendicular to one another. The layers of positive and negative uniaxial crystal could be spaced apart or adjacent to one another.

Furthermore, one aspect of the present invention provides a method for achieving a desired retardance with a wave plate. The method includes providing a plurality of layers of uniaxial crystal (e.g., positive and/or negative uniaxial crystals), as well as substantially aligning a respective fast axis of each layer either substantially parallel or perpendicular to one another such that a retardance of each layer adds to or subtracts from a total retardance of the plurality of layers. Moreover, the method may include selecting a thickness of each of the first and second layers so that a predetermined amount of retardance is achieved. The method could also include selecting a thickness of the layers such that a combined angle sensitivity of the layers is at least partially reduced.

BRIEF DESCRIPTION OF THE SEVERAL VIEWS OF THE DRAWINGS

Figure 1:
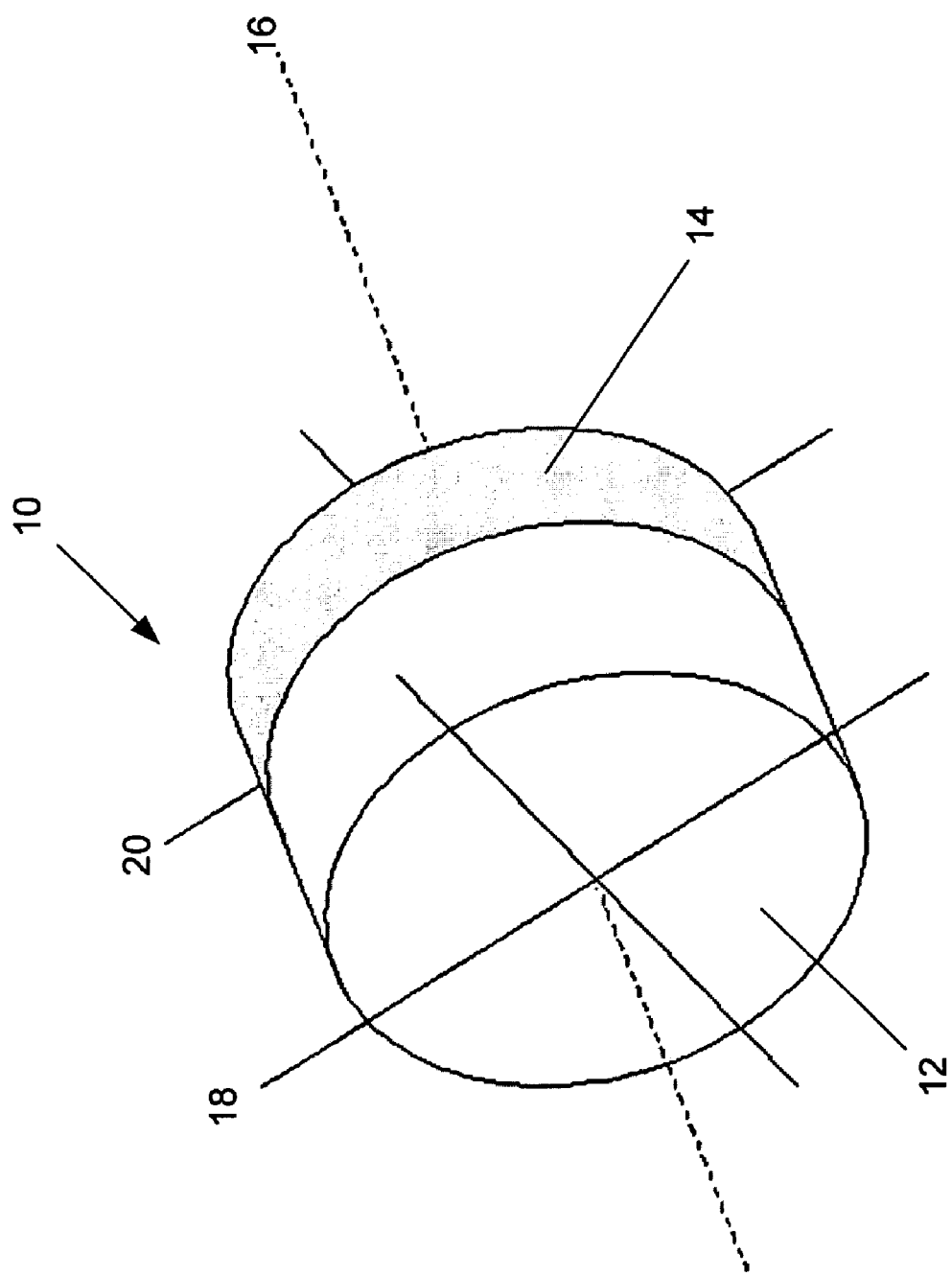
Figure 2:
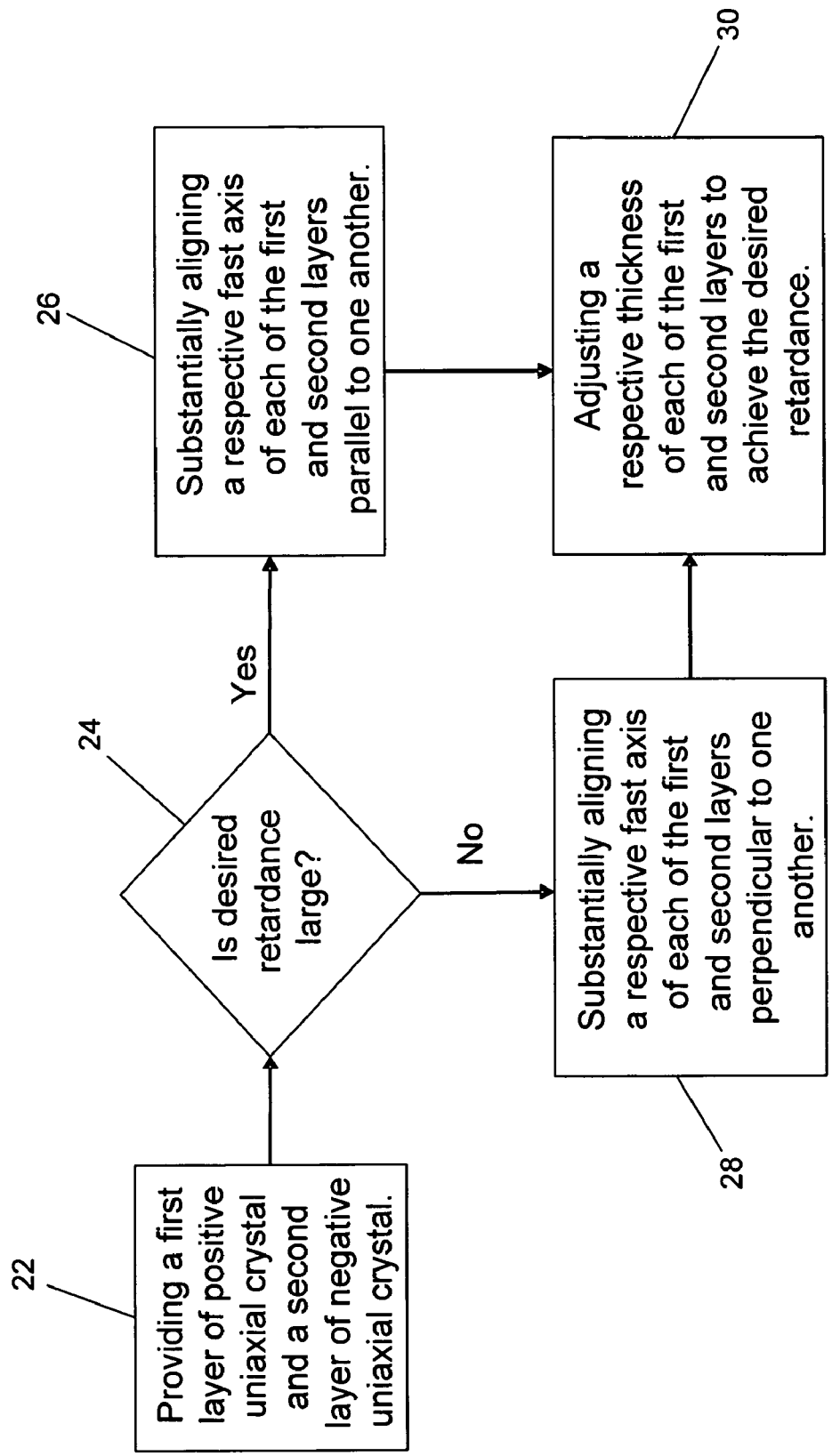
Figure 3:
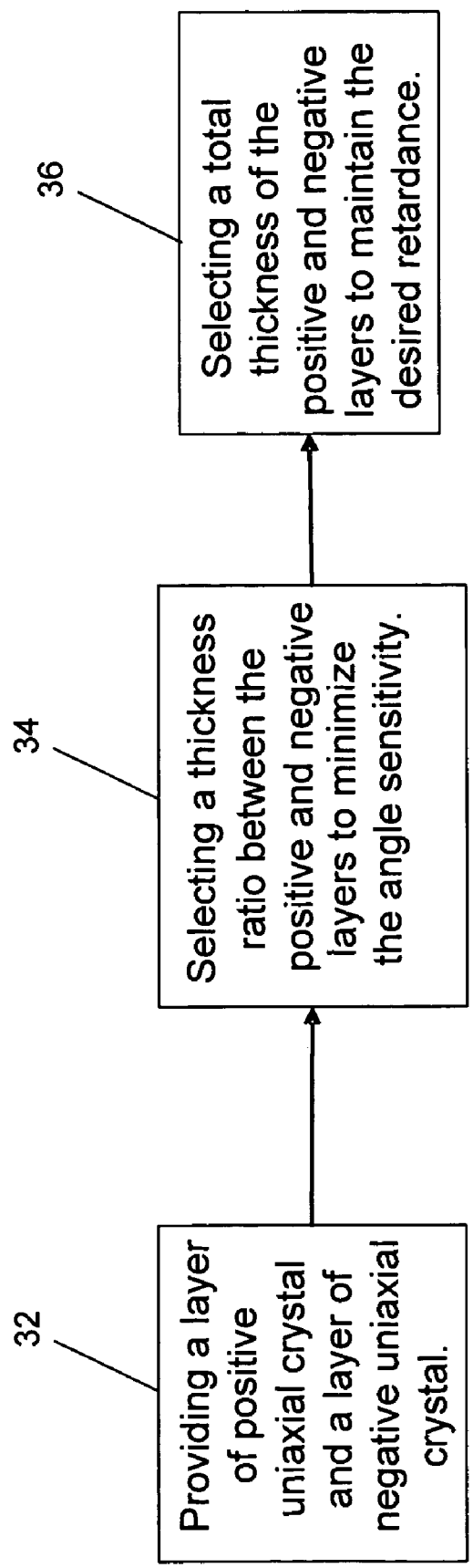

Having thus described the invention in general terms, reference will now be made to the accompanying drawings, which are not necessarily drawn to scale, and wherein:

FIG. 1 is a perspective view of a wave plate according to one embodiment of the present invention;

FIG. 2 is a flowchart illustrating a method for achieving a desired retardance with a wave plate; and FIG. 3 is a flowchart illustrating a method for reducing an angle sensitivity of a wave plate.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1, there is shown a wave plate 10. The wave plate 10 generally includes a positive layer of uniaxial crystal 12 and a negative layer of uniaxial crystal 14. In the embodiment shown, the fast axes 18 and 20 of respective positive 12 and negative 14 layers are substantially commonly aligned with one another. As a result, the positive 12 and negative 14 layers are aligned such that the retardance of each of the layers adds together. In addition, the thicknesses of the positive 12 and negative 14 layers may be selected so that the angle sensitivity of each of the layers are substantially equal and opposite to one other. Thus, the angle sensitivities may be reduced or eliminated such that the wave plate 10 is applicable to a wider range of optical signals passing therethrough relative to the nominal axis 16.

As used herein, the term "wave plate" is not meant to be limiting, as the wave plate 10 may be any suitable device, retardation plate, or retarder for controlling or routing polarized optical signals therethrough. For example, the wave plate 10 could be a multi-order wave plate. Moreover, the wave plate is suitable for a variety of applications, such as optical and laser technologies, as well as many others.

The positive layer of uniaxial crystal 12 could be any suitable positive uniaxial material, such as quartz. The negative layer of uniaxial crystal 14 could be any negative uniaxial material, such as sapphire. The relative thicknesses of the positive layer 12 and the negative layer 14 depend on the birefringence properties of the chosen materials. The positive 12 and negative 14 layers are positioned adjacent to one another and are typically attached with a suitable securing technique. For example, the positive 12 and negative 14 layers could be attached with an optically transparent epoxy. However, it is understood that there may be instances where the positive 12 and negative 14 layers are not adjacent to one another. For instance, the positive 12 and negative 14 layers could be separated by a neutral material (i.e., having a common index of refraction for all axes) or could be physically separated from each other.

Retardance of the wave plate 10 is dependent upon wavelength and the thickness of the positive 12 and negative 14 layers of uniaxial crystal, as evidenced by the equation:

$$\delta = \frac{(\beta_{12} \times t_{12}) - (\beta_{14} \times t_{14})}{\lambda}$$

where $\beta_{12}$ and $\beta_{14}$ are the birefringence (the difference between the extraordinary and ordinary indices) of the two layers, $t_{12}$ and $t_{14}$ are the thicknesses of the birefringent layers, and $\lambda$ is the wavelength of the incident optical signal. Thus, the retardance is directly proportional to the thickness of the positive 12 and negative 14 layers, while the retardance is inversely proportional to the wavelength of the incident optical signal.

Therefore, it is understood that the retardance of the wave plate 10 of the present invention may be varied for any number of wavelengths and thicknesses. As such, the representation of the positive 12 and negative 14 layers of uniaxial crystal shown in FIG. 1 is exemplary only, as the positive layer could be thinner than the negative layer, or the layers could be the same thickness. In addition, although only a single positive 12 and negative 14 layer of uniaxial crystal is shown, it is understood that there could be any number of positive and negative uniaxial crystals. For instance, there could be two layers of positive uniaxial crystal 12 and one layer of negative uniaxial crystal 14. Moreover, it is understood that although the positive 12 and negative 14 layers of uniaxial crystal are shown in FIG. 1 to be cylindrical, it is understood that the layers could be any number of sizes and configurations in additional aspects of the present invention. For example, the positive 12 and negative 14 layers of uniaxial crystal could be elliptical or include concave or convex surfaces thereon. In addition, the fast axes of all of the layers do not have to be commonly aligned. For example, the fast axis 18 of the positive layer 12 could be substantially aligned 90 degrees from the fast axis 20 of the negative layer 14 (i.e., the fast axes are perpendicular) such that the retardance of the layers at least partially cancel one another.

FIG. 2 illustrates a flowchart according to one embodiment of the present invention for achieving a desired retardance of the wave plate 10. After providing a wave plate 10 having positive 12 and negative 14 layers (block 22), the desired retardance of the wave plate is determined (block 24). If the retardance is large, the fast axes 18 and 20 of respective positive 12 and negative 14 layers are substantially commonly aligned as shown in FIG. 1 and described in FIG. 2 (block 26). As such, the retardance of the positive 12 and negative 14 layers add together. If the desired retardance of the wave plate 10 is not large, the fast axes 18 and 20 of respective positive 12 and negative 14 layers are aligned substantially perpendicular to one another such that the retardance at least partially cancels one another (block 28). Thereafter, the thicknesses of the positive 12 and negative 14 layers may be adjusted to achieve a desired retardance of the wave plate 10 (block 30). Thus, the thicknesses of the positive 12 and negative 14 layers may be chosen to affect the total retardance of the wave plate 10.

The fast axes 18 and 20 of respective positive 12 and negative 14 layers are described as being substantially aligned parallel or perpendicular to one another, such that it is understood that the fast axes are not required to perfectly align with one another, as there may be slight imperfections, human error, or other factors that prohibit perfect alignment.

For instance, the fast axes 18 and 20 may be positioned to substantially align with one another to at least result in the retardance of the layers adding together. In addition, although the fast axes 18 and 20 of the layers of uniaxial crystal 12 and 14, respectively, are commonly aligned (i.e., parallel) in the illustrated embodiment of the present invention, it is understood that there may be instances where the fast axes are substantially perpendicular while still employing layers of uniaxial crystal that are positive and negative. For instance, there could be a positive layer and a negative layer of uniaxial crystal aligned so that their retardances nearly cancel to give a wave plate with low retardance and little or no angle sensitivity.

Because retardance is highly sensitive to the angle of incident optical signals, the wave plate 10 compensates for this angle sensitivity by canceling, or nearly canceling, the angle sensitivity of the positive 12 and negative 14 layers. By selecting the thicknesses of the positive 12 and negative 14 layers (blocks 32, 34, and 36), as shown in FIG. 3, the angle sensitivity of each layer is effectively cancelled due to the fact that the sign of the angle sensitivity is opposite for each layer. In addition, a desired retardance can be maintained by selecting the total thickness of the positive 12 and negative 14 layers. Accordingly, substantially reducing or eliminating the angle sensitivity ensures that the retardance of the wave plate 10 is not significantly affected by changes in the angle of the incident optical signals.

In another embodiment of the present invention, an angle compensator can be constructed using a first and second layer of the same type of crystal with substantially the same thickness and having the fast axes of the first and second layers substantially aligned perpendicular such that the on-axis retardance is nominally zero. The retardance of the first and second layers cancels at an optical incidence angle of zero, but the angle sensitivity adds such that the retardance increases with increasing incidence angle. The total thickness of the first and second layers is chosen to give an angle sensitivity that is equal in magnitude to that of a third layer. The crystal type of the first and second layers is chosen to give an angle sensitivity that is an opposite sign to that of a third layer. In this way the third layer may have a predetermined thickness independent of any angle sensitivity considerations. Whatever angle sensitivity the third layer has can be compensated for by the first and second layers without affecting the nominal retardance. In a similar way, the first and second layers may be used to compensate for some other source of angle sensitivity in the optical system.

The various embodiments of the present invention provide several advantages. For example, the wave plate 10 combines the properties of different crystal types in such a way that the angle sensitivity of the positive 12 and negative 14 layers of uniaxial crystal cancel each other. As such, the wave plate 10 is not dependent on the angle of the incident optical signals, so that the wave plate is more versatile than conventional wave plates. In addition, canceling the angle sensitivity is achieved without requiring very thin layers of uniaxial crystals. Accordingly, the wave plate 10 may be fabricated with more practical thicknesses of positive 12 and negative 14 layers. Moreover, aligning the fast axes 18 and 20 of the positive 12 and negative 14 layers, respectively, results in adding the retardance of each layer, which can provide a high-order wave plate while still remaining relatively unaffected by the angle of incident optical signals.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multi-order wave plate comprising:
   a plurality of layers of uniaxial crystal, wherein a respective fast axis of at least a pair of layers is substantially commonly aligned or substantially perpendicular such that a retardance of the pair of uniaxial crystals is cumulative or at least partially cancels one another, and wherein a thickness of each of the layers of uniaxial crystal is configured to at least partially reduce an angle sensitivity of the wave plate.

2. The wave plate according to claim 1, wherein at least one layer of uniaxial crystal comprises a layer of positive uniaxial crystal.

3. The wave plate according to claim 2, wherein the layer of positive uniaxial crystal comprises quartz.

4. The wave plate according to claim 1, wherein at least one layer of uniaxial crystal comprises a layer of negative uniaxial crystal.

5. The wave plate according to claim 4, wherein the layer of negative uniaxial crystal comprises sapphire.

6. The wave plate according to claim 1, wherein at least a pair of layers of uniaxial crystal have substantially the same retardance and the fast axes of the pair are aligned substantially perpendicular such that the on-axis retardance of the pair is nominally zero.

7. The wave plate according to claim 6, further comprising at least one additional layer of uniaxial crystal, wherein an angle sensitivity of the at least one additional layer and the pair of layers are substantially equal and opposite to one another.

8. A wave plate comprising:
   at least one layer of positive uniaxial crystal; and
   at least one layer of negative uniaxial crystal having a thickness and position relative to the positive uniaxial crystal such that an angle sensitivity of the positive uniaxial crystal is substantially equal and opposite to an angle sensitivity of the negative uniaxial crystal, wherein a fast axis of each of the layers of positive and negative uniaxial crystal are substantially aligned such that a retardance of the positive and negative uniaxial crystals is cumulative.

9. The wave plate according to claim 8, where the layers of positive and negative uniaxial crystal are spaced apart from one another.

10. The wave plate according to claim 8, wherein the layers of positive and negative uniaxial crystal are positioned adjacent to one another.

11. The wave plate according to claim 8, wherein the layer of positive uniaxial crystal comprises quartz.

12. The wave plate according to claim 8, wherein the layer of negative uniaxial crystal comprises sapphire.

13. A method for achieving a desired retardance with a wave plate comprising:
    providing a multi-order wave plate comprising a plurality of layers of uniaxial crystal;
    selecting a thickness of the layers such that a combined angle sensitivity of the layers is at least partially reduced; and
    substantially aligning a respective fast axis of each layer either substantially parallel or perpendicular to one another such that a retardance of each layer of uniaxial crystals adds to or subtracts from a total retardance of the plurality of layers.

14. The method according to claim 13, further comprising selecting a thickness of the layers so that a predetermined amount of retardance is achieved.

15. The method according to claim 13, wherein providing comprises providing at least one layer of positive uniaxial crystal.

16. The method according to claim 13, wherein providing comprises providing at least one layer of negative uniaxial crystal.

17. A wave plate comprising:
a plurality of layers of uniaxial crystal, wherein a respective fast axis of at least a pair of layers is substantially commonly aligned such that a retardance of the pair of uniaxial crystals is cumulative, and wherein a thickness of the layers is selected such that a combined angle sensitivity of the layers is at least partially reduced.

18. The wave plate according to claim 17, wherein at least one layer of uniaxial crystal comprises a layer of positive uniaxial crystal.

19. The wave plate according to claim 17, wherein at least one layer of uniaxial crystal comprises a layer of negative uniaxial crystal.

* * * * *